UNITED STATES PATENT OFFICE.

WILLIAM GEBHARDT, OF SAN ANTONIO, TEXAS, ASSIGNOR OF ONE-HALF TO ALBERT KRONKOSKY, OF SAME PLACE.

FOOD COMPOUND AND METHOD OF MAKING SAME.

SPECIFICATION forming part of Letters Patent No. 606,624, dated June 28, 1898.

Application filed July 30, 1897. Serial No. 646,558. (No specimens.)

*To all whom it may concern:*

Be it known that I, WILLIAM GEBHARDT, a citizen of the United States, residing at San Antonio, in the county of Bexar and State of Texas, have invented a new and useful Food Compound and Method of Making Same, of which the following is a specification.

My invention relates to compounds, and particularly to condiments for use in cooking; and the object in view is to provide in a dry powdered state a compound containing chilli-pepper and adapted for use in the preparation of a Mexican dish known as "chilli-con-carne" and also as a condiment for flavoring soups, stews, sauces, and the like.

The use of chilli-pepper or pesado with other flavoring agents or ingredients—such as a variety of garlic, cumin, and other vegetable productions—in connection with the preparation of chilli-con-carne is not new in the culinary art, and it has been the common practice to add the several ingredients selected for the purpose at the time of preparing the chilli-con-carne or immediately prior thereto, whereby the proportions of the ingredients must be known to the cook. A primary disadvantage of this common practice is that some of the ingredients necessary to produce the desired flavor in chilli-con-carne cannot be preserved with their original flavors for any length of time, and in addition to this the necessity of preparing and adding the several ingredients separately adds greatly to the difficulty of preparing the resulting dish.

To produce a condiment consisting of a compound containing all of the necessary flavors to make chilli-con-carne and produce said condiment in a dry powdered form containing in approximately their full strength the several flavors of the ingredients, said prepared condiment being adapted to be preserved in any climate for any desired length of time without losing its strength or properties, is the main object of my invention, and as the difficulty in making such a compound resides, essentially, in the preparation, in a dried state, of the chilli-pepper and garlic which enter into the compound, without losing the flavor of either of these ingredients, is a matter of consideration (the drying of chilli-pepper and garlic usually serving to destroy all of the essential flavors of said products) it will be seen that an important object in view is to provide a process whereby the drying and preparing of chilli-pepper and garlic may be attained without the said objectionable loss of flavor and strength.

It should be noted that the strength of chilli-pepper is not materially affected by drying, except that the percentage of strength to its weight is increased, but the flavor is somewhat depreciated in the drying process.

The compound forming the embodiment of my invention contains the following ingredients: Prepared chilli-pepper and garlic, two hundred parts, by weight; powdered cumin-seed, fifteen parts, by weight, and origanum, variety known as "*Origanum creticum*" or "*cretici*," (white dittany of Crete,) seven parts, by weight.

In preparing the compound I first make a solution consisting of black Singapore pepper, five pounds, and origanum or white dittany of Crete, (*Origanum creticum* or *cretici*,) two pounds; distilled water, ten gallons, and alcohol, one gallon, allowing the mixture to stand in order that the pepper and origanum may become thoroughly saturated, the time required being about twenty-four hours. At the end of this time the solution should be strained to extract all of the flavor from the solid ingredients.

The preparation of the above solution is the first step in the preparation of the Mexican chilli-pepper and garlic, and in further reference thereto I will term it a "solution of black pepper and dictamo."

I now take the Mexican chilli-peppers or pesado (*Capsicum annuum*) and after extracting all of the stems and seeds from the hulls I add to every one hundred pounds of hulls twenty pounds of garlic, (*Allium schaen-oprasum*, or *Allium sativum*.) To the mixture of chilli-pepper hulls and garlic the above-described solution of black pepper and dictamo is added, the same being allowed to soak for about one hour. The mass thus formed is then ground, chopped, or otherwise finely comminuted, and is rolled or pressed into thin layers or strips resembling vermicelli. I have found in practice that this step in the process of preparing chilli-pepper may be conveniently prosecuted by the aid of a meat-chopping machine, such as that known to the trade as the "Enterprise Meat-Chopper." After thus forming the moist mass or paste resulting from the above-mentioned grinding into thin layers or strips it is spread thinly upon trays, preferably of reticulated material, such as wire-cloth, and is exposed to a drying heat at a temperature of approximately 125° Fahrenheit, fresh air being supplied continuously by a fan and the heat being preferably that produced by steam-radiators. This drying step in the process occupies about twenty-four hours, and immediately after its completion the final step of pulverizing must be prosecuted, no delay in pulverizing the dried compound being desirable for the reason that the strips rapidly absorb moisture when exposed to a normal temperature, and thus become soft or pasty, and hence difficult to grind. The reason that the flavor of chilli-pepper and garlic is retained during the drying process, as above described, (and this forms the most important point in the preparation of the compound embodying my invention,) is that the pasty mixture of chilli-pepper and garlic when exposed to the drying heat in the thin strips above described becomes crusted or coated on the outside by the quick drying of the surface, and hence the interior retains its original flavor, no means being provided for its escape. Furthermore, an important point in connection with the drying of the chilli-pepper and garlic is that they must be intimately mingled in the form of a paste, which, being ground or chopped, causes an approximately homogeneous mass, whereby both the chilli-pepper and the garlic are affected in the same way by the drying process.

Obviously the concluding step in the preparation of the compound is the addition to the powdered preparation of chilli-pepper and garlic of the powdered cumin-seed, known as "Malta cumin-seed," (*Cuminum cyminum*,) and the origanum, (*Origanum cretici*,) the proportions being, as above indicated, two hundred pounds of the prepared chilli-pepper and garlic to fifteen pounds of cumin-seed and seven pounds of origanum. The cumin-seed and origanum should be dried thoroughly and powdered before adding the same to the powdered preparation of chilli-pepper and garlic.

From the above description it will be seen that the only serious difficulty in the preparation of a dry compound containing the ingredients mentioned is the preparation of chilli-pepper and garlic in a dry powdered state without losing any of the essential flavors of those ingredients; but the preparation of the garlic is the more difficult of the two, in that, as is well known, the drying of garlic or the extraction of the moisture therefrom deprives it of that flavor which, being peculiar to garlic, is desirable in a compound such as that forming the subject-matter of my invention. Hence the preparation of garlic to form a dry powder containing all the essential flavoring of the fresh garlic is the most important feature of the process hereinbefore described, and in the effectiveness of said process resides the value of the compound when completed. It will be seen that in order to prepare the garlic in the dry powdered state without losing its peculiar flavor and strength I have found it desirable to combine it in the manner particularly described with chilli-pepper and proceed with the preparation of both of these ingredients simultaneously. The advantage of thus preparing these two ingredients of the compound resides in the fact, as hereinbefore stated, that when the paste containing the two ingredients, after having been reduced to the fine strips mentioned, is subjected to heat, the crust of the surfaces of the strips insures the retention of the flavors, whereby the completely-dried article has the flavor which is peculiar to the fresh plant.

Having described my invention, what I claim is—

1. A dry powdered condiment comprising a dried and ground mixture of chilli-pepper and garlic impregnated with black pepper and origanum; together with powdered flavorants, in substantially the proportions specified.

2. A dry powdered condiment comprising a dried and ground mixture of chilli-pepper and garlic impregnated with black pepper and origanum; and powdered cumin-seed and origanum, in substantially the proportions specified.

3. The herein-described process of preparing a chilli-pepper compound for use as a condiment, the same consisting in saturating a mixture of chilli-pepper hulls and garlic in a solution, in water and alcohol, of black pepper and origanum; then grinding and pressing the moist mass to form thin sheets or strips; then drying said sheets or strips; subsequently grinding the dried sheets or strips; and finally adding cumin and origanum, all being combined substantially as and in the proportions specified.

4. The herein-described process of preparing a chilli-pepper compound for use as a condiment, the same consisting in obtaining a solution of black pepper and origanum, grinding and mixing chilli-pepper and garlic, saturating the mixture with the solution, drying and granulating the saturated mixture, and adding to it powdered flavorants, substantially as and in the proportions specified.

In testimony that I claim the foregoing as my own I have hereto affixed my signature in the presence of two witnesses.

WILLIAM GEBHARDT.

Witnesses:
C. G. CARTBAR,
ALBERT KRONKOSKY.